(No Model.)
G. W. RAFTER.
FILTER.
No. 524,865. Patented Aug. 21, 1894.
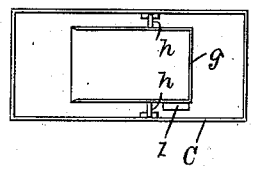
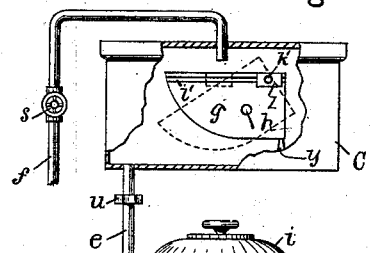
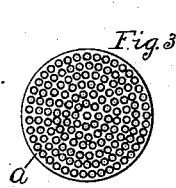
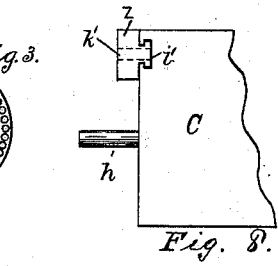
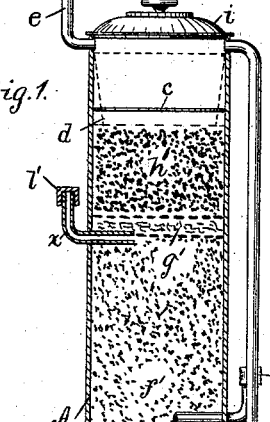
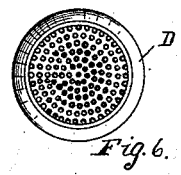
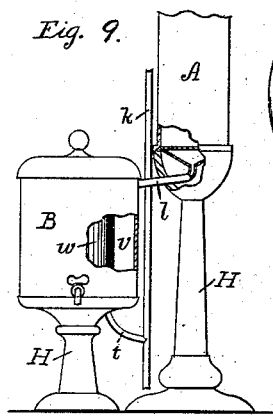
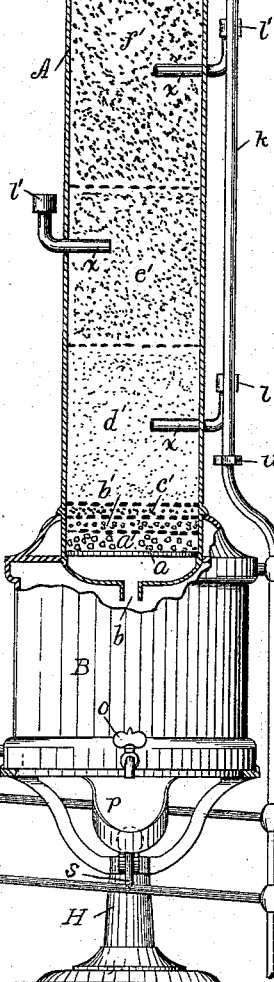
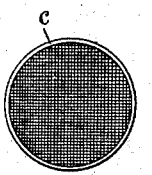
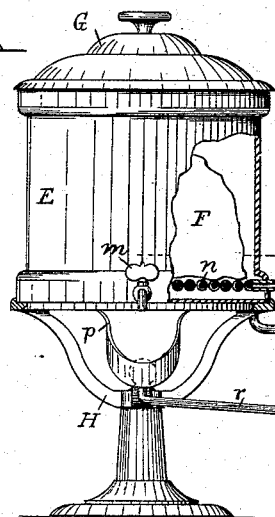
Attest:
M. E. Winston.
M. Langworthy.
Inventor:
Geo. W. Rafter,
By E. B. Whitmore
Atty.

UNITED STATES PATENT OFFICE.

GEORGE W. RAFTER, OF ROCHESTER, NEW YORK.

FILTER.

SPECIFICATION forming part of Letters Patent No. 524,865, dated August 21, 1894.

Application filed June 5, 1893. Serial No. 476,622. (No model.)

*To all whom it may concern:*

Be it known that I, GEORGE W. RAFTER, of Rochester, in the county of Monroe and State of New York, have invented a new and useful Improvement in Filters, which improvement is fully set forth in the following specification and shown in the accompanying drawings.

My invention relates more particularly to domestic filters or filters for the purification of water for drinking, culinary or other similar purposes. While this filter is intended to clarify water by straining out silt or other foreign inorganic matter held in suspension, the principal and main object of the invention is to produce a filter that will destroy and remove from the water, by means hereinafter fully set forth, all bacteria and disease germs it may contain.

It has come to be a well-known fact, from actual observation and experiment, that a very large proportion of the disease germs which find their way into the human system are introduced through the agency of water either by drinking or by eating food in which in one way or another such living germs have become incorporated. Hence the sterilization of water which is to be used for drinking or other domestic purposes becomes a matter of the first importance and should be provided for in domestic filters the same as for the straining out of extraneous inorganic matter that may be present in water. Ordinarily filters are adapted only to the purpose of clarifying water and are neither intended nor constructed to completely destroy minute life presented in the form of bacteria or disease germs; nor are they designed to remove the products resulting from the continuous destruction of such germs. Contaminated water treated in such filters, even though rendered clear, may still contain disease germs in as great abundance as in the water before being filtered. Moreover, it has been found that in such filters the filtering material itself frequently becomes a breeding place in which germs are produced in great numbers although the water passing through may be comparatively free from them, with the result that they pass from the filtering material into the filtered water rendering it unfit for domestic use.

I have aimed in this invention to construct and arrange the parts so that the filtering material shall be self-cleansing and so remain perpetually pure, needing no renewing save as to some of the upper parts hereinafter mentioned. To accomplish this I have constructed the filter so as to apply to the purification of water the principle of the reducing action of biological agents existing either naturally, or produced artificially within the filter itself, or, if necessary, artificially cultivated outside the filter and introduced therein when required.

The filtering material in this filter is so selected, arranged and subsequently treated, as to produce a maximum development of the microbe of nitrification or the nitrifying ferment, which is the natural active agent in reducing organic matter and disease germs in water to innocuous nitrogen gas and mineral nitrites and nitrates, care being taken also to provide for the proper clarification of the water. With this filter there is also provided an intermitter for the water supply this being essential to the effective operation of the filter, a constant presence of air mingled with the water in the body of the filtering material being indispensable for the reduction of organic matter as well as for the destruction of germs.

Referring to the drawings Figure 1 is a side elevation of my improved filter, parts being vertically sectioned and broken away. Fig. 2 is a plan of the cooler partly broken away to show the interior. Figs. 3 and 4 show different forms of perforated plates used in the device. Figs. 5 and 6 show respectively a side elevation and an interior view of a basin for catching silt. Fig. 7 is a plan of the intermitter for the water supply. Fig. 8, drawn to a larger scale, better shows the regulator for the intermitter. Fig. 9, drawn to a smaller scale, shows a simple modification of the device.

The filter proper consists of a vertical cylindrical filter barrel A, Fig. 1, resting at its lower end upon, and communicating with, a storage jar B, in which to receive the filtered water. I preferably make this barrel cylindrical though it may be made square, hexagonal, octagonal, or other form in cross section, and fluted or otherwise ornamented according to taste. I make the barrel in the ordinary sized filters about five and one-half feet in height and from seven to ten inches in internal diameter. It may be made of galvanized iron or other sheet metal with glass, enamel or porcelain lining, or of earthenware, stoneware, terra cotta or other pottery product. The filter barrel may also be made of wood. A perforated disk $a$, shown in plan in Fig. 3, is placed at the bottom of the barrel, forming a floor upon which the filtering material rests.

The filtering material consists of graduated layers of selected gravel and sand, a layer of loam also being added near the top of the mass. The arrangement of these materials in the filter barrel which I have found to be the most effective ordinarily in practice is substantially as follows: First I place upon the perforated floor $a$, clean selected gravel stones about three-fourths of an inch in diameter, to the depth of one and one-half inches, as in the space $a'$, Fig. 1. Above this, in the space $b'$, I place one inch in depth of finer gravel ranging from one-half inch in diameter down to the size of peas; and finally, in the space $c'$, one inch in depth of selected coarse sand with grains about one-twentieth of an inch in diameter. Upon this substructure the filtering material proper is placed, consisting of first one foot of selected sand, in the space $d'$, having about fifteen per cent. of the grains finer than one one-hundred and fiftieth of an inch in diameter; second above this, in the space $e'$, one foot of selected sand having about twelve per cent. of the grains finer than one one-hundredth of an inch in diameter; third above this, in the space $f'$, about two feet of selected sand with about twelve per cent. of the grains finer than one seventy-fifth of an inch in diameter. Next, in the space $g'$, I place two inches of yellow loam taken from a cultivated field; and finally, at the top in the space $h'$, I place seven inches of coarse sand with grains averaging about one-fortieth of an inch in diameter.

It will be seen from the foregoing description that the filtering material between the layer of loam and the substructure of gravel and coarse sand is progressively finer from the loam downward, also that the sand above the loam is the coarsest of all above the substructure. This arrangement of the filtering material is for treating ordinary lake or river water; but different classes of water, that is to say, waters differently contaminated may require different treatments and differently arranged filtering masses within the barrel. Before being placed in the barrel all the sand material is washed clean and sterilized by being heated in iron pans. The yellow loam, however, is placed in the filter barrel without either washing or heating, the function of the loam being to inoculate the filtering material below it with the nitrifying organisms which exist in great abundance in the soil of cultivated fields.

The coarse sand above the loam acts partly as a strainer to take out of the water the coarser impurities although at the same time the biological process of reduction goes on in its interstices. This coarse sand needs to be taken out occasionally and replaced by fresh material, this being rendered necessary on account of its serving in part as a silt catcher. This changing of the sand, however, does not need to be frequent when ordinarily clear waters are filtered. The loam forms a nidus for the nitrifying organism which, first developing therein, finally inoculates the entire mass of filtering material below it. The graded sand beneath the loam and between the latter and the substructure of gravel, which, as has been stated, is progressively finer downward from the top, is the active and really the essential part of the filter. Through the action of natural forces this portion of the filtering material becomes plentifully supplied with the nitrifying organism from the loam above, and it is in the interstices of this graded mass that disease germs are reduced or destroyed by virtue of the antagonism of the nitrifying organism to all such.

It has been already stated that water is supplied to the filter intermittently. This is an important part of the action of the filter, the result of the intermittency being that volumes of water and air alternated are moved successively down through the filter by virtue of the action of gravity upon the water, the latter and the air alternating in proportion to the frequency and the amount of the separate volumes of water supplied by the intermitting mechanism. In its descent through the filtering material the water becomes finely divided and spread in thin laminæ over and among the particles of sand whereby every portion is brought in contact with the nitrifying ferment; it is further brought freely in contact with the oxygen of the air also passing downward through the filter. In this manner the filtered water not only becomes sterilized but is thoroughly aerated and rendered palatable.

If too fine material be employed in the upper portion of the filter the latter is liable to become clogged by overwork when the filter is forced. If, however, the mass of filtering material below the loam is made tolerably coarse at the top and progressively finer downward, as above described, more interstitial space will be left in the upper part for the action of the nitrifying ferment. In this way the particles of organic matter which otherwise might lessen the efficiency of the filter by collecting therein faster than they could become reduced, are effectually provided for; for while a part are reduced in the upper coarse portion of the filtering material, room is left for the balance to pass on downward to become reduced at lower levels. By thus arranging the filtering material an absolute destruction of all organic matter is provided for and at the same time the construction admits of maintaining a fair rate of filtration. Furthermore, this portion of the filtering material, that is to say, the mass below and including the loam, is self-cleansing and remains perpetually pure. The net result of the destruction of organic matter by the action of the nitrifying ferment or of the biological processes taking place in the filtering material, is the production of (1) a small quantity of free nitrogen, and (2) of harmless mineral nitrites and nitrates. The free nitrogen finds its way into the common stock of nitrogen in the atmosphere while the harmless soluble mineral products, which result from the combination of the balance of the nitrogen of the organic matter with such mineral basis as gypsum in the filtering material, pass downward with the filtered water into the storage jar. The gypsum exists naturally in the sand and the loam but if in too small quantities and the filter is not sufficiently active, the energy of the nitrifying organism and consequently the purifying capacity of the filter, may be increased by occasionally adding small quantities of gypsum. This process of continual resolution of the organic matter into free nitrogen gas and mineral nitrites and nitrates, and the passing away of the products as stated, effectually prevents the accumulation of organic matter in the interstices of the filtering material. On this account the filtering material below the layer of coarse sand does not need to be renewed, and this constitutes an important and essential difference between my herein described invention and continuous filters, that is to say, filters constructed for clarifying water supplied to them by a continuous flow, or by water applied in bulk to the top of the filter and allowed to pass through without intermittence.

In preparing this filter for actual use it is desirable to prevent a stratification of the filtering material below the loam—the aim being to maintain a single graduated mass between the loam and the substructure. The filtering material is placed in the filter barrel dry and an initial supply of water at the top would tend to cause it to stratify. But if the mass be primarily wetted from the bottom by supplying water to be taken up through it by capillary attraction, stratification will be effectually prevented. In order to accomplish this result I contract the lower end of the filter barrel into a pipe b, Fig. 1, to which a hose may be attached for supplying water to primarily wet the filtering mass. After the filtering material is thus saturated it is ready to receive water at the top for the purpose of filtration. Near the upper end of the filter barrel I place a perforated disk c, shown in plan in Fig. 4, which receives the shock of the water flowing into the filter. This disk serves to break the force of the inflowing water and prevents it from disturbing and washing out of shape the upper surface of the sand in the space $h'$ at the top of the barrel; and it also serves to distribute the water evenly over this sand. A clear air space d, of about one inch in depth is left between the disk and the sand. This I find to be better in practice than to place the disk directly upon the sand; for bubbles of air which sometimes cling to it when in contact with the sand and tend to prevent an even flow of water through it, are prevented from forming on its surface when a space is left between it and the sand.

The filter is supplied with water through a tank C which may be located at any convenient point near to or distant from the filter, care being only taken to set it at a higher level than the top of the filter barrel. The water from the tank is conducted to the top of the filter barrel through a pipe e. f represents a supply pipe leading from a street main, reservoir, or other source of water supply, provided with a cock s, to control the flow of the water through it. Within the tank I employ an intermitting device to interrupt the flow of water through the pipe f to the filter barrel. Any device that will effectually intermit the flow of water will fairly well answer the purposes of this invention but I prefer a device which can be regulated to control the amount of the water discharged at each action, the frequency of discharges being controlled by regulating the rate of the flow of water through the supply pipe f by the cock s.

The intermitter shown is a tilting basin g, held upon horizontal trunnions h, so as to both tip forward and to recover its normal position as the load of water it carries changes. The basin is made heavier at the right of the trunnions than at the left, as it appears in Fig. 1, so that its normal position is level, as shown in full lines, the heavy end resting upon a support y. Though heavier at the right of the trunnions the basin extends farther to the left than to the right on account of which an inflow of water causes the center of gravity of the body to move toward the left. And when it passes the axis of the trunnions the basin will tip, as indicated by dotted lines, and discharge the water it contains. This occurring the basin again assumes its position of horizontality until again tilted by the water. A shiftable weight z, is provided to control the action of the basin. This weight is fitted to slide in a longitudinal groove $i'$, in the side of the basin and it is held in place by a simple fastener, as a set screw $k'$. By moving this weight toward the left the basin becomes more sensitive to the action of the water and tilts when a less quantity is contained therein. By this means the amount of water delivered to the filter at each discharge may be finally regulated.

In case the water supplied to the filter is unusually muddy I employ a basin or silt catcher D, Figs. 5 and 6, in the top of the filter, as indicated by dotted lines, to primarily receive the muddy water. This basin has a perforated bottom and it is filled with coarse sand; and when silt accumulates in it the sand is replaced by clean sand. When the basin is employed it is placed directly upon the sand at $h'$, the disk $c$ being removed. The upper end of the filter barrel is open which admits of the taking out and replacing of the basin, there being a removable cover $i$ provided for the barrel.

When a filter is new and first started, with the exception of the layer of loam, the filtering material contains little or no nitrifying ferment. This ferment however exists in small quantities in all natural waters and after the filter has been used for a time the ferment, gradually extending from the loam downward, will become established in quantity in the interstices of the entire mass of filtering material. In order, however, to get a more rapid and thorough inoculation of the filter with the nitrifying organism than can be obtained by the natural process and by the colonizing action of the loam, I insert bent tubes $x$, in the side of the barrel through which to introduce small quantities of a pure culture of the nitrifying organism. The tubes extend at their inner ends nearly to the middle of the barrel and are provided with external caps or closers $l'$, which are removed to introduce the ferment. This being done the process of nitrification will take place in the water passing through the filter the same as though the filtering material had gradually become charged or supplied in the natural way.

An overflow pipe $k$, is provided for the upper end of the barrel and the storage jar. This pipe and the inflow pipe $e$ are each supplied with a union joint $u$, which admit of the disconnection of the filter barrel.

With this filter I usually employ a cooler E, connected with the storage jar by a horizontal pipe $l$. This pipe, as the cooler is commonly constructed, is bent into a horizontal coil $n$, near the floor, terminating in a cock $m$. The filtered water from the storage jar passes through the turns of the coil and is rendered cool by a block of ice F, resting upon the coil. The open upper end of the cooler is closed by a removable cover G. The cooler like the storage jar may be made in any ornamental or fanciful form and of any suitable material, as sheet metal, earthenware, wood, &c. The storage jar is provided with a cock $o$, through which to draw filtered water directly from the storage jar itself.

The storage jar and the cooler are provided with drip pans $p\ p$, of some suitable form and kind provided with drip pipes $r\ s$, communicating with the overflow pipe $k$. A drip pipe $t$, is also provided for the cooler, communicating with the overflow pipe.

The storage jar and the cooler are usually mounted upon iron stands H H, of ornamental design.

In the modification shown in Fig. 9, the storage jar and the cooler are combined in one, the filtered water flowing from the filter barrel directly into a vertical annular space $v$, surrounding a central ice chamber $w$.

Some disease germs possess greater vitality than others and hence have greater power for resisting the destructive effect of the nitrifying organism. In treating water containing such germs it sometimes becomes necessary to use a longer filter barrel in order to provide a greater depth of filtering material below the loam. With such greater length of the filter barrel more time is given for the destructive action of the nitrifying organism.

What I claim as my invention is—

1. A filter having a filter barrel charged with a mass of graded filtering material arranged so as to be progressively finer from above downward, a layer of loam above said filtering material, and a layer of sand above the loam and a series of branch pipes at the side of the filter barrel, leading one into each of the graded layers of the filtering material for introducing pure culture of nitrifying organism into any of the said layers, as described.

2. A filter having a filter barrel charged with a mass of graded filtering material arranged so as to be progressively finer from above downward, a layer of loam above the filtering material, and a layer of sand above the loam, in combination with a tilting basin for regulating the flow of water to the filter, as described.

3. A filter having a filter barrel charged with a mass of graded filtering material arranged so as to be progressively finer from above downward, a layer of loam above the filtering material, and a layer of sand above the loam, in combination with a tilting basin provided with a horizontal groove along its side, and a weight in the groove, and movable with respect to the bearings of the tilting basin, as described.

4. The herein described method of filtering which consists in passing the water intermittently through a filtering bed into which pure culture of nitrifying organisms has been introduced.

In witness whereof I have hereunto set my hand, this 2d day of June, 1893, in the presence of two subscribing witnesses.

GEO. W. RAFTER.

Witnesses:
ENOS B. WHITMORE,
M. L. WINSTON.